(12) United States Patent
Chickneas (10) Patent No.: US 8,001,552 B1
(45) Date of Patent: Aug. 16, 2011

(54) MODEL MERGER USING AN EXPORT MAP

(75) Inventor: Jason Chickneas, Berwyn, PA (US)

(73) Assignee: Bentley Systems, Incorporated, Exton, PA (US)

( * ) Notice: Subject to any disclaimer, the term of this patent is extended or adjusted under 35 U.S.C. 154(b) by 914 days.

(21) Appl. No.: 11/955,069

(22) Filed: Dec. 12, 2007

(51) Int. Cl.
*G06F 13/00* (2006.01)
(52) U.S. Cl. ............. 719/313; 719/316; 707/999.1; 707/999.101
(58) Field of Classification Search .......... 719/313, 719/316; 707/999.1, 999.101
See application file for complete search history.

(56) References Cited

U.S. PATENT DOCUMENTS

| | | |
|---|---|---|
| 5,572,637 A | 11/1996 | Brown et al. |
| 5,852,535 A | 12/1998 | Richardson et al. |
| 6,341,291 B1 | 1/2002 | Bentley et al. |
| 6,671,701 B1 | 12/2003 | Chouinard |
| 6,912,707 B1 | 6/2005 | Fontes, Jr. |
| 7,130,775 B2 | 10/2006 | Takagaki et al. |
| 7,194,489 B2 | 3/2007 | Bentley et al. |
| 7,559,048 B1 * | 7/2009 | Bedell et al. ............. 717/101 |
| 7,793,255 B1 * | 9/2010 | Kawaguchi et al. ........ 717/100 |
| 7,840,619 B2 * | 11/2010 | Horn .............................. 707/829 |

OTHER PUBLICATIONS

"Bentley Structural" Manual, Oct. 11, 2005, pp. 1-487.

* cited by examiner

*Primary Examiner* — Andy Ho
(74) *Attorney, Agent, or Firm* — Cesari and McKenna, LLP (57) ABSTRACT

In one embodiment, data is exchanged between a modeling application and an external application. A user initiates an export of model data from the modeling application, where the model data is descriptive of a model maintained in the modeling application. An export map is generated that captures an indication of each object in the model at the point in time of export of the model. Model data is passed to the external application. Subsequently, modified model data is received from the external application. The modified model data is compared with the export map to detect external modifications made by the external application. Limited portions of the model in the modeling application are updated to reflect the external modification, while intact portions of the model for which external modifications have not been detected are left intact.

21 Claims, 8 Drawing Sheets

MODEL MERGER USING AN EXPORT MAP

BACKGROUND

1. Technical Field

The present disclosure relates generally to computer-aided engineering design and more specifically to techniques for "round tripping" model data between a structural modeling application and an analytical application.

2. Background Information

To better manage the complexities of modern designs, engineers often turn to computer-aided engineering design. In computer-aided engineering design, an engineer creates a model that embodies an engineering project. The model is typically refined and analyzed, in part, using analytical tools. A completed model may be used to generate presentation documents (such as plans, elevations and perspectives) and quantification reports (such as quantity reports, schedules, and cost estimates), useful in executing the engineering project.

One particular use of computer-aided engineering design is in the deployment of structural systems for buildings, industrial plants, civil projects, and the like. An engineer tasked with the design of a structural system may first prepare an initial draft of a design using a structural modeling application. For example, the engineer may turn to an application such as the Bentley Structural™ building information modeling (BIM) application, available from Bentley Systems Inc., the Revit® Structure application, available from Autodesk Inc., or another similar software package. A structural modeling application typically provides the engineer with a number of predefined intelligent structural forms, such as steel girders, concrete beams, timber studs, etc. Using a computer aided design (CAD)-like interface, the engineer may place, arrange, and configure these structural forms, to design the structural system. Often, the engineer will work initially with physical representations of the structural forms. That is, he or she may manipulate physical representations to create a physical model that approximates the appearance of a realworld structural system.

As a physical model is often not best suited for structural analysis, optimization, code checking, or other types of in-depth analytical processing, the engineer may next turn to an analytical model. An analytical model typically represents a structural system in terms of a series of equations that may be solved for reactions, rotations, and the like. Some structural modeling applications generate an analytical model in a background process as a physical model is being constructed by the engineer. That is, as the engineer places and arranges physical representations to create a physical model, corresponding analytical representations may be automatically placed in a parallel analytical model.

While a structural modeling application may offer some native analytical processing functionality, some types of advanced analytical processing are more typically offered by separate analytical applications. For example, STAAD® structural engineering software available from Research Engineers International offers finite element, linear static, response spectra, time history, cable, pushover, and non-linear analysis, as well as other advanced functionality. Similarly, RAM® structural software, available from RAM International, offers a variety of types of advanced analysis functionality. A number of other commercially available analytical applications provide useful functionality.

To utilize the functionality of a separate analytical application, an engineer typically exports the analytical data from the structural modeling application to the analytical application. Typically, exporting entails translation from a file format used internal to the structural modeling application to a differing file format used by the analytical application. Once the analytical data is exported, it is commonly subject to repeated rounds of analysis, code checking and/or optimization within the analytical application. Each of these rounds may result in changes to the data, as the structural system is refined and fine tuned. When a "final" set of analytical data is reached (at least for this stage of the design process) it typically is imported back into the structural modeling application. Such importing generally involves another translation of file formats, this time from the file format used internal to the analytical application to the file format used in the structural modeling application.

The imported analytical data typically overwrites some, or all, of the version of the analytical model in the structural modeling application. The physical model is then updated to reflect the changes in the analytical model. The overall process of export and subsequent import of analytical data is commonly referred to as "round tripping." Such round tripping may occur repeatedly during the design of a complex structural system, where a design may evolve considerably over time.

However, there are a number of shortcomings with current round tripping techniques that hinder efficient import and export of data. As discussed above, when modified analytical data is imported back into a structural modeling application, at least some of the analytical model in the structural modeling application is typically overwritten. Such overwriting typically occurs without regard to existing objects in the model, writing over both portions that have been changed by the analytical application and that have not is been changed by the analytical application. This has a number of undesirable implications.

For example, there is typically a danger of introducing errors in the structural system. Such danger is particularly acute if work continues in the structural modeling application, while analytical data is being subject to analysis and refinement in the analytical application. If an engineer makes changes within the structural modeling application, some of these changes may be lost when overwriting of the analytical model occurs. Similarly, overwriting may sometimes inadvertently create duplicates within the models of the structural modeling application. Inadvertent loss or duplication is sometimes quite difficult to detect, absent lengthy manual review and verification.

Such difficulty is typically often compounded by incomplete reporting of changes upon import of an analytical model in existing systems. While some existing structural modeling applications may detect and report some types of changes during import, other types of changes are commonly not detected or reported. For example, deletion of structural forms in the analytical application (hereinafter referred to as "external deletes") are typically not detected or reported. Accordingly, if an engineer desires to know exactly what has been externally deleted, he or she may have to spend extended time manually reviewing and comparing models.

Accordingly, there is a need for improved techniques for round tripping model data between a structural modeling application and an analytical application.

SUMMARY

In one embodiment, the shortcomings of the prior art are addressed by a novel round tripping technique, where modifications made in an external application are recognized, reported to a user, and intelligently merged into a model based, in part, on an export map. The export map represents a "snapshot" of a model at the time it was exported to, or just after it was previously imported from, an external application, identifying each object that exists in the model at that point in time. Upon subsequent importation of a modified version of model data, the export map is used as a basis for comparison to permit improved recognition, reporting and merging of external modifications.

More specifically, an engineer may create a physical model and an analytical model of a structural system within a structural modeling application. These models may include a plurality of different objects, corresponding to graphics and non-graphics features. Objects are associated with unique element identifiers (ID). At some point in time, the engineer may choose to export analytical data to a particular analytical application, for example to perform some type of analysis. Analytical data is translated to a format understood by the analytical application, which may use an independent set of object identifiers, i.e., "external IDs." At the time of export, an export map is generated that may include a list of element IDs and/or a list of external IDs for every object exported, depending on the capabilities of the analytical application.

The analytical data may be subject to repeated rounds of analysis, testing, and optimization at the analytical application in which modifications to the analytical data may be made. After modifications, the modified data may be imported back into the structural modeling application. Upon import, a comparison is made between either element IDs in the modified data and the list if element IDs in the export map, or external IDs in the modified data and the list of external IDs in the export map, as appropriate. Such comparison may yield an indication of external modifications, including deletions which have previously been difficult to detect. The external modifications are reported to a user, and may be intelligently merged into the existing analytical model. That is, rather than indiscriminately overwriting duplicate objects, existing objects that have been externally modified are updated to reflect new properties. The export map is also updated.

Such technique may advantageously prevent the loss or duplication of members within models, even if work continues on the models while data is being modified at the analytical application. Further, such techniques may enable more comprehensive reporting of external modification, including reporting of external deletes.

BRIEF DESCRIPTION OF THE DRAWINGS

The description below refers to the accompanying drawings, of which.

DETAILED DESCRIPTION

Figure 1:
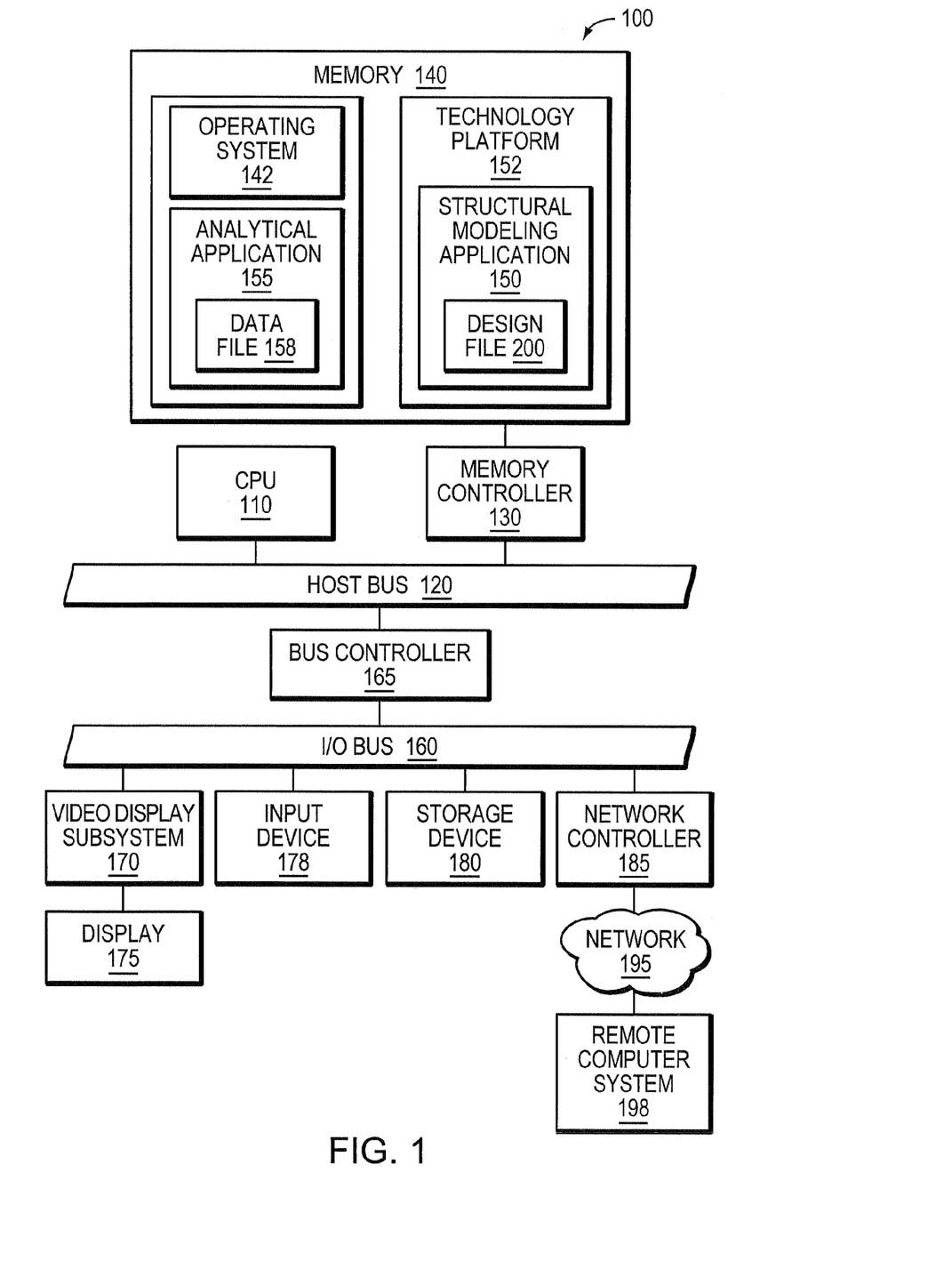
FIG. 1 is a block diagram of an example computer system in which at least some of the presently described techniques may be employed.

FIG. 1 is a block diagram of an example computer system 100 in which at least some of the presently described techniques may be employed. The computer system 100 includes at least one central processing unit (CPU) 110 coupled to a host bus 120. The CPU 110 may be any of a variety of commercially available processors, such as an Intel x86 processor, an IBM PowerPC processor, a SPARC processor, or another type of processor. A memory 140, such as a Random Access Memory (RAM), is coupled to the host bus 120 via a memory controller 130. The memory 140 is adapted to store at least a portion of an operating system 142 while the computer system 100 is operating. In addition, the memory 140 may store portions of application software, including portions of a structural modeling application 150, and in some cases, a separate (i.e., external) analytical application 155, as discussed in more detail below.

The host bus 120 of the computer system 100 is coupled to an input/output (I/O) is bus 160, such as a Peripheral Component Interconnect (PCI) bus, through a bus controller 165. A video display subsystem 170, coupled to a display 175, may be connected to the I/O bus 160. The display 175 may show a user interface of the structural modeling application 150, and, in some cases, a user interface of the analytical application 155. Similarly, one or more input devices 178, such as, a keyboard, a mouse, or a touch pad, may allow a user to interface with the applications 150, 155.

A storage device 180, such as hard disk drive, a compact disk (CD) drive, Digital Video Disc (DVD) drive, or other type of device, may be coupled to the I/O bus 160 and persistently store data, including computer-executable instructions. Such persistently stored data may be loaded to the volatile memory 140 when needed. For example, computer-executable instructions related to the operating system 142, the structural modeling application 150, and, in some cases, the analytical application 155 may be stored in the storage device 180 until they are needed.

The I/O bus 160 may further be coupled to a network controller 190 that interfaces with a computer network 195. The computer network 195 may allow communication between the computer system 100 and other computer systems, for example a remote computer system 198, using any of a number of well known network protocols. Such network communication may allow certain remote, distributed and/or parallel computing configurations.

In more detail, the structural modeling application 150 may be a building information modeling (BIM) application operating within a common technology platform 152. Such a common technology platform 152 may provide base functionality relating to object management, geometric modeling, drafting, information and standards management, visualization, drawing and report extraction, as well as other tasks. In the illustrative embodiment, the structural modeling application 150 is the Bentley Structural™ BIM application, available from Bentley Systems Inc., and the technology platform 152 is the MicroStation Triforma® technology platform, also available from Bentley Systems Inc. However, the structural modeling application 150 may alternately be another application, such as the Revit® Structure application available from Autodesk Inc., or another software application that provides modeling functionality. Similarly, the technology platis form 152 may be a different technology platform, or may not be employed at all, depending on the particular implementation.

Figure 2:
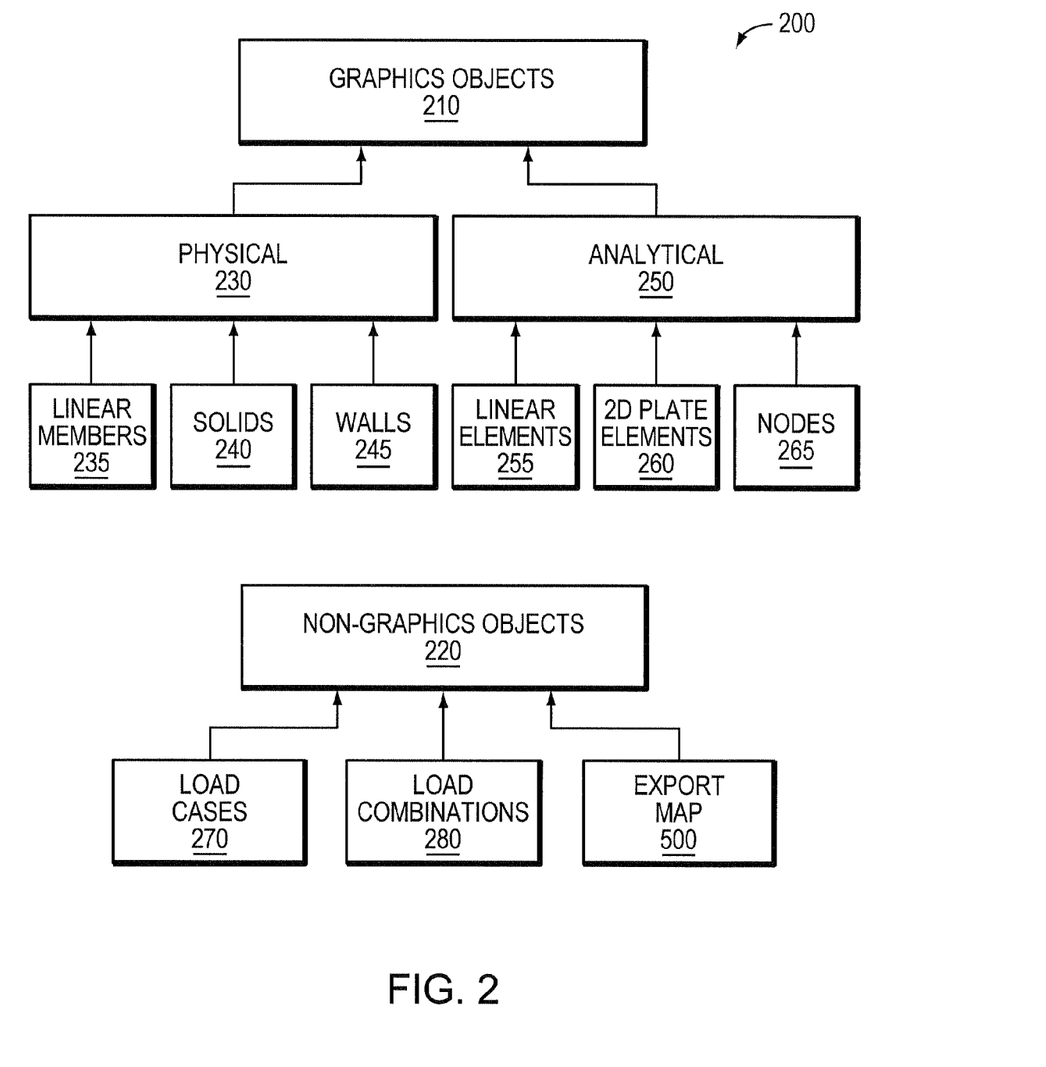
FIG. 2 is a block diagram of example data structures included in a design file.

The structural modeling application 150 may store models of a structural system in a design file 200, or multiple design files. In the illustrative embodiment, the design file 200 is a DGN file formatted according to the MicroStation® V8 DGN standard. Such file 200 maintains a physical model, an analytical model and non-graphics data descriptive of a structural system. Alternately, the design file 200 may be a differently formatted file. For example, the design file 200 may be a DWG file, a DXF file or a file formatted according to any of a variety of other known standards. Further details relating to the organization of a design file 200, and its use with the presently disclosed techniques, may be found below.

The analytical application 155 may be a STAAD® structural engineering application available from Research Engineers International, a RAM® structural application available from RAM International, a MIDAS® general-purpose structural analysis application available from MIDAS Information Technology Co., Ltd., a GSA™ structural analysis application available from Oasys Limited, a RISA® structural analysis application available from RISA Technologies, Inc., or any of a variety of other analytical applications that allow a user to analyze, test, refine, fine tune, and/or optimize a system. The analytical application 155 may maintain data descriptive of a structural system in a data file 158, or multiple data files, formatted according to a standard employed by the analytical application 155. For example, the data file 158 may be an RSS file, a STD file, or a file formatted according to another standard.

A data file 158 used by an analytical application 155 may be generated by exporting the analytical data from the structural modeling application 150. In an export, the design file 200 of the structural modeling application 150 is typically translated by a translator (not shown) used with the analytical application 155, and translated model data is written to the data file 158. In this manner, an engineer need not separately create an analytical model within the analytical application 155, but rather may export existing work to establish such a model. Once analytical data is accessible to the analytical application 155, it may be subject to repeated rounds of analysis, code checking and/or optimization. In each of these rounds, the data may be refined and fine tuned to address any issues raised. When "final" analytical data is reached, it is typically imported back into the structural modeling application 150, where it is used to update the analytical model and the physical model maintained therein, as discussed in more detail below. Thus, in effect, the analytical model is "round tripped" between the two applications.

While FIG. 1 depicts both the structural modeling application 150 and the analytical applications 155 as resident in the memory 140, for execution locally on CPU 110, they may instead be resident on differing computer systems. For example, in one alternate configuration, the analytical application 155 may be resident in the memory of, and executed on, a remote computer system 198. In such a configuration, exporting and importing of the analytical model may include transmission of model data over a computer network 195. Accordingly, it should be understood that the techniques described herein are not limited to application in a single computer system 100, but may also used with a variety of remote, parallel, and/or distributed computing arrangements.

Figure 3A:
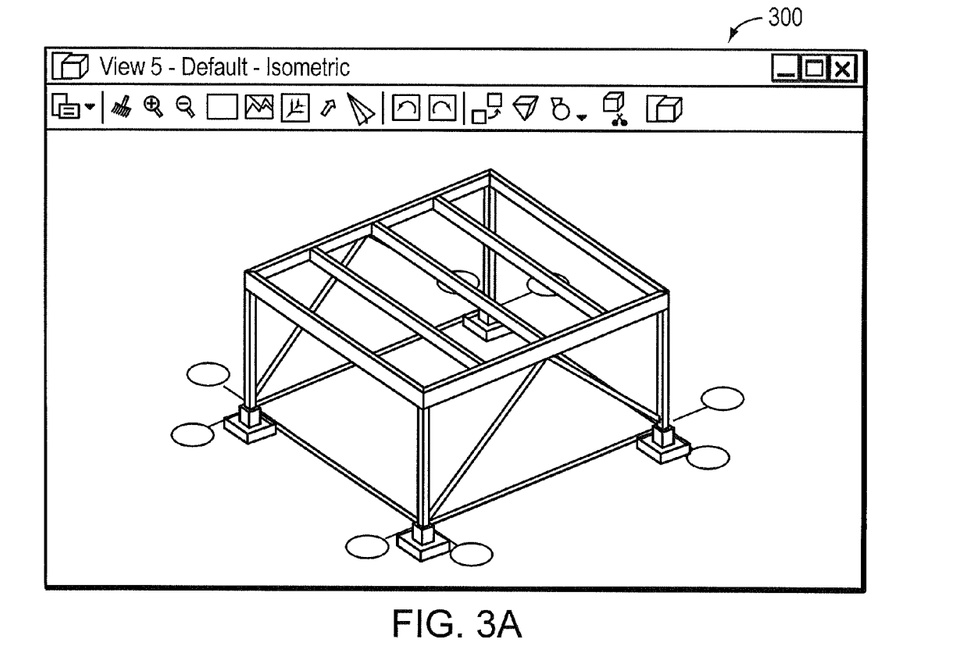
FIG. 3A is an isometric view of an example physical model.

FIG. 2 is a block diagram of example data structures that may be included in a design file 200. The design file 200 may include two primary types of data structures: graphics objects 210 that may be visually represented to a user, and non-graphics objects 220 that do not have a ready visual representation. A graphics object 210 includes physical object 230, such as linear members 235, solids 240, and walls 245, which collectively define a physical model of a structural system. An isometric view 300 of an example physical model is depicted in FIG. 3A.

Figure 3B:
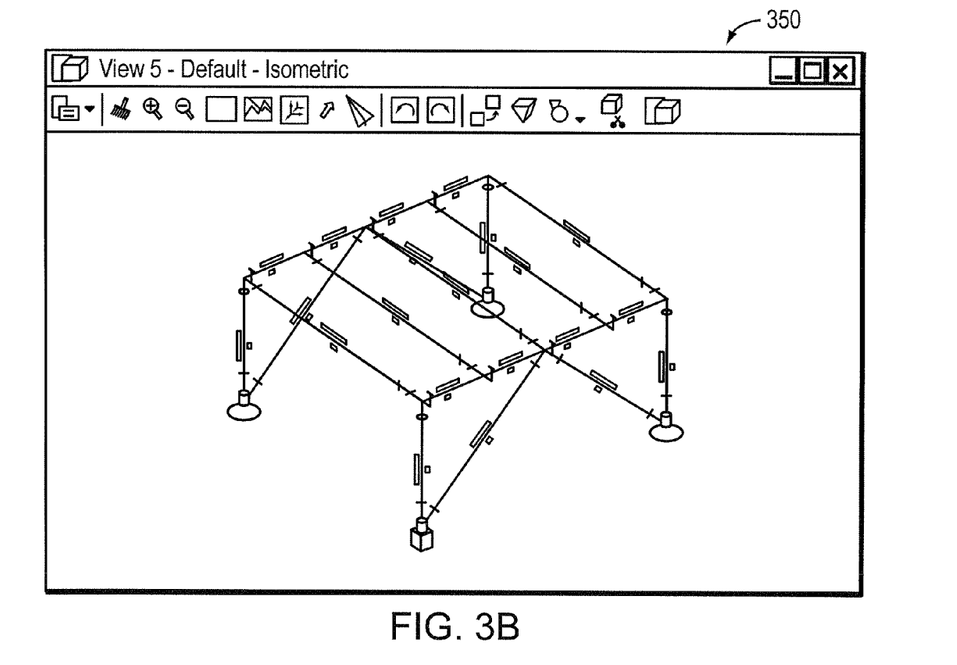
FIG. 3B is an isometric view of a visual representation of an example analytical model of the same structures as shown in FIG. 3A.

A graphics object 210 also includes analytical objects 250, such as linear elements 255, 2D plate elements 260, and nodes 265, which collectively define a parallel analytical model of the structural design. An isometric view 350 of a visual representation of an analytical model is depicted in FIG. 3B.

In addition to graphics objects 210, the design file 200 further includes non-graphics objects 220. Non-graphics objects 220 may include load cases 270 and load combinations 280 that define loads incident on structural forms. Typically, each object in the design file 200 is associated with an element identifier (ID) (not shown) used to identify objects in the structural modeling application 150. In the illustrative embodiment, is the element IDs are Microstation® Element IDs, however in alternate implementations they may take on any of a variety of other forms. The element IDs are typically non-graphic in nature and are generally assigned automatically by the system, outside of the control of a user.

Figure 5:
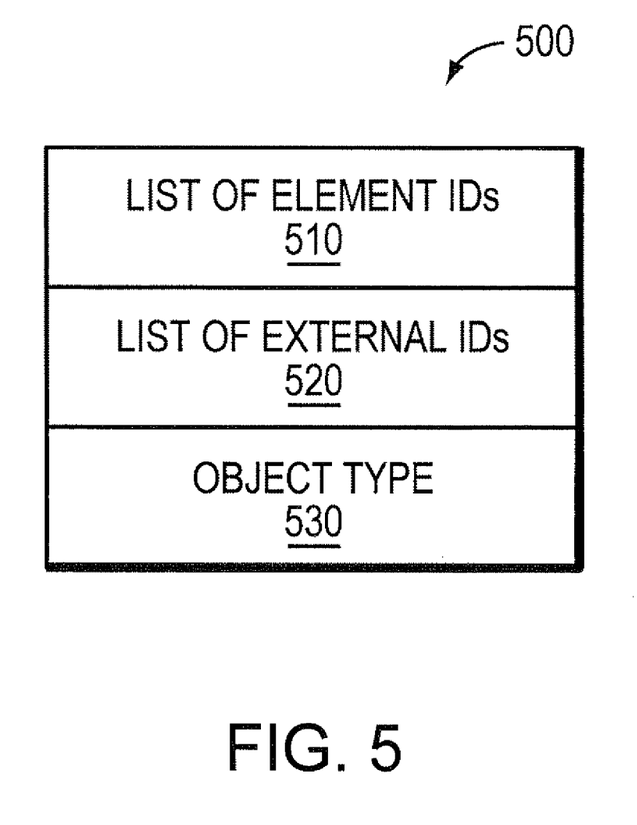
FIG. 5 is a block diagram of an example export map.

Element IDs may be used in conjunction with a novel export map 500. As discussed in more detail below, the export map 500 is a non-graphics object that captures a "snapshot" of a structural model at the time analytical data is exported or just after it was previously imported, indicating each object that exists in the model at that point in time. The export map 500 provides a basis for comparison when a modified version of the analytical data is subsequently imported as part of a round tripping operation.

In order to understand the operation of the novel export map 500, it is helpful to consider how identifiers are used in round tripping of data between a structural modeling application 150 and an analytical application 155. As discussed above, each object in a design file 200 is associated with an element ID. For example, in reference to FIG. 4, a particular analytical object 410 is associated with a particular element ID 420. When the analytical model in the design file 200 is exported, a translator 430a, 430b generates corresponding representations 440a, 440b for use in the analytical application 155a, 155b. The translator typically associates each corresponding representation 440a, 440b with an ID 450a, 450b used by the analytical application 155a, 155b (hereinafter an "external ID"). Such external IDs 450a, 450b typically follow an ID system of the analytical application 155, which often has been developed independently from the system used within the structural modeling application 150.

Figure 4:
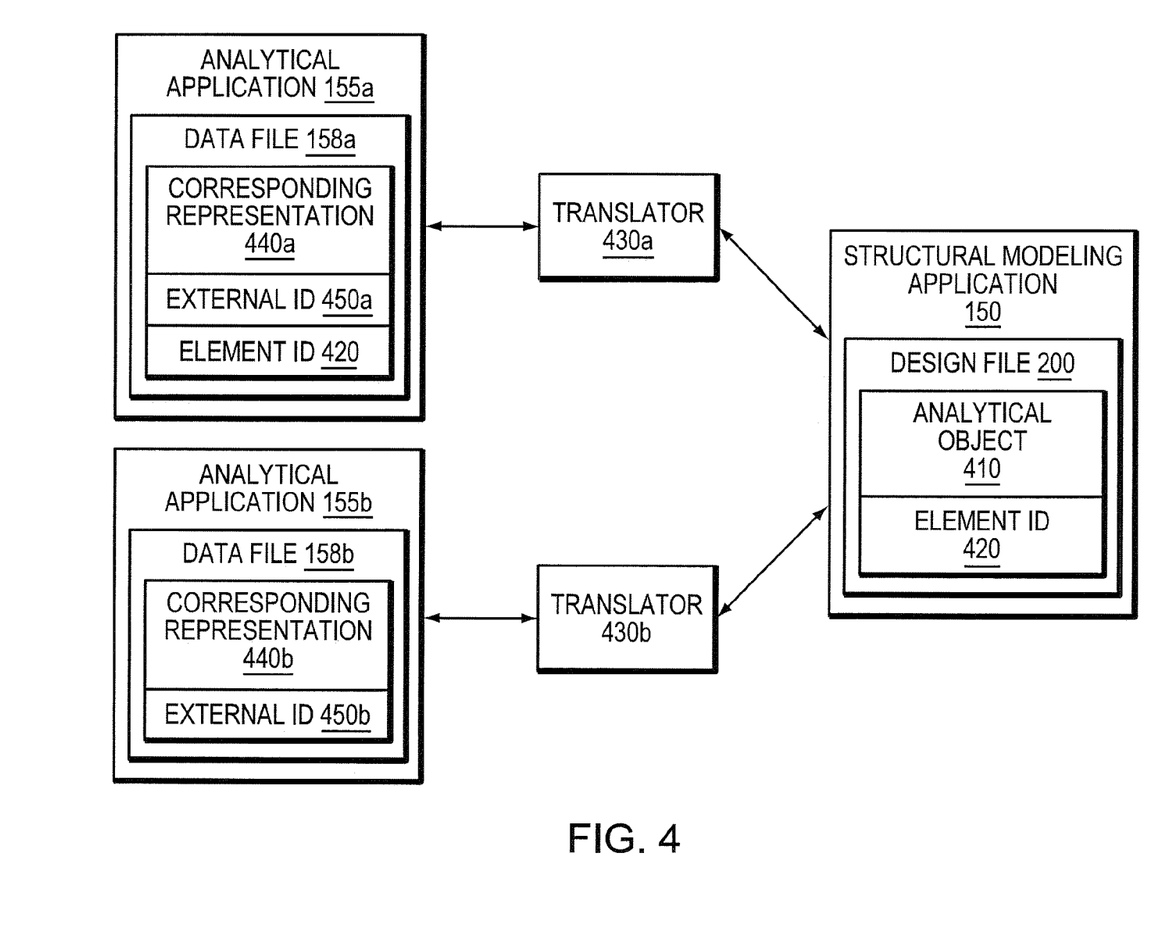
FIG. 4 is an abstracted block diagram that illustrates the use of identifiers in round tripping of data between a structural modeling application and an analytical application.

The data file 158a of some analytical applications 155a is capable of storing both external IDs 450a as well as copies of element IDs 420, thus preserving a record of element IDs 420. For example, STAAD® structural engineering applications allow for such storage of element IDs. However, the file format of others analytical applications 155b is only capable of storing external IDs 450b, and thus the data file 158b contains no indication of element IDs. For example, RAM® structural applications typically may only store external IDs.

When analytical data is imported back in to the structural modeling application 150, translator 430a, 430b accesses the element IDs and/or external IDs stored in the data file 158a, 158b and uses them in conjunction with the export map 500 of the design file 200 to report and merge external modifications.

FIG. 5 is a block diagram showing an example export map 500 in greater detail. A list of element IDs 510 is configured to store element IDs 510 for every object that exists in the design file 200 at the time the analytical model is exported. Similarly, a list of external IDs 520 is configured to store corresponding external IDs 520 for the objects at the time of export. Finally, corresponding object type data 530 indicates object types associated with the element IDs and external IDs, for example, an indication that an ID refer to a linear member, a solid, a wall, etc.

Depending on the capabilities of the analytical application 155, only certain of the lists 510, 520 may actually be utilized. For example, when the file format of the data file 158 of the analytical application 155 is capable of storing element IDs, only the list of element IDs 510 may need to be employed. However, when the file format of the data file 158 is incapable of storing element IDs, it may be necessary to use both the list of element IDs 510 and the list of external IDs 520.

The export map 500 is preferably maintained as a non-graphical object in the design file 200 of the structural modeling application 150. While analytical data is being refined and modified at the analytical application 155, the export map 500 remains unchanged in the structural modeling application, even if work proceeds in the application. That is, should an engineer continue to work within the structural modeling application 150, for example by placing or changing structural forms, such changes are not reflected in the export map 500.

When modified analytical data is subsequently imported back into the structural modeling application 150, the export map 500 may be used as a basis of comparison to determine which portions of the analytical model have been changed externally. This is facilitated by comparison of external IDs or element IDs in the data file 158 to the list of external IDs 520 or the list of element IDs 510 in the export map 500. As discussed below in more detail, external modifications may be readily detected, reported to a user and intelligently merged into the analytical model in the structural modeling application 150.

Figure 6:
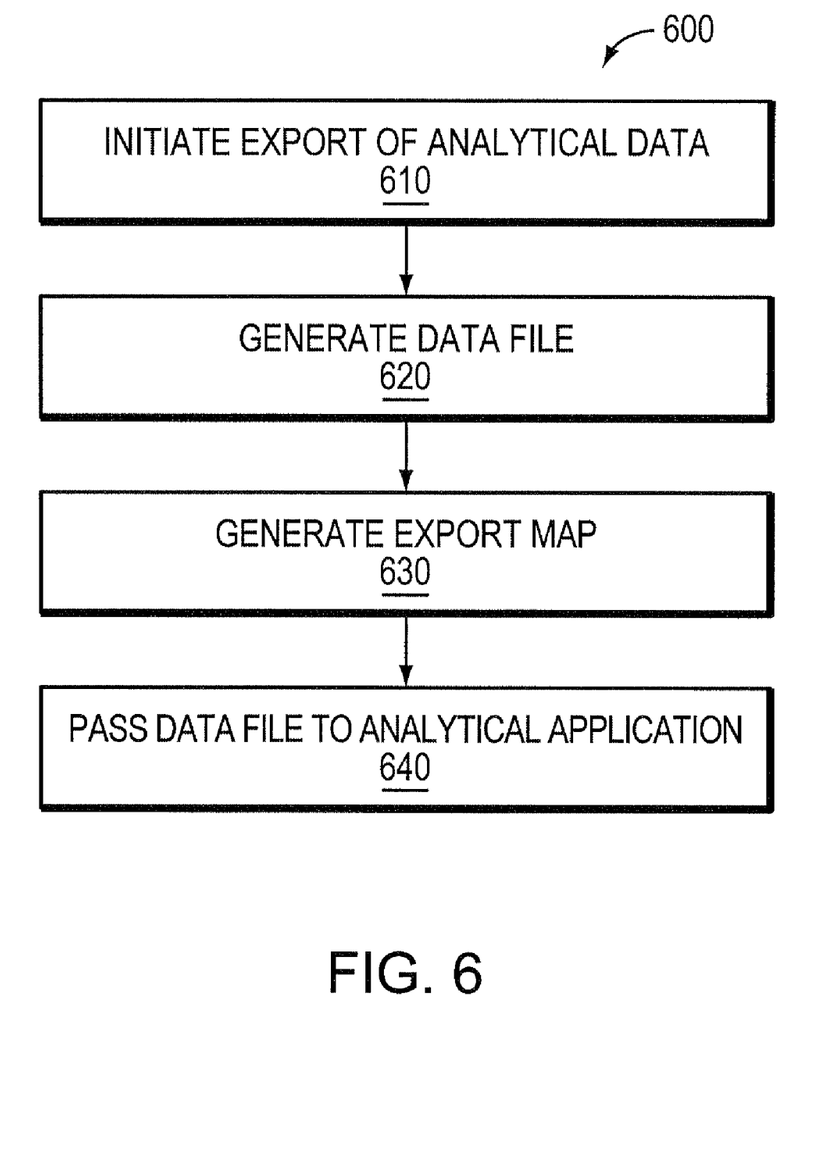
FIG. 6 is a flow diagram of an example export operation of analytical data from a structural modeling application to an analytical application.

FIG. 6 is a flow diagram of an example export operation of analytical data from a structural modeling application 150 to an analytical application 155. At step 610, a user selects an option to initiate an export of analytical data to a particular analytical application 155, for example by using a graphical user interface. At step 620, a translator generates a data file 158 from the data according to a file format understood by the analytical application 155. Depending on the file format, either external IDs, or a combination of external IDs and element IDs are written to data file 158. At step 630, an export map 500 is generated and stored as a non-graphics object within the design file 200. If the data file 158 is capable of storing element IDs, the translator may simply write a list of element IDs 510 and corresponding object type data 530 to the export map 500. If the data file 158 is incapable of storing element IDs, the translator may write both a list of element IDs 510 and a list of external IDs 520, as well as corresponding object type data 530, to the export map 500. At step 640, the data file 158 is passed to the analytical application 155 for analytical processing.

Figure 7:
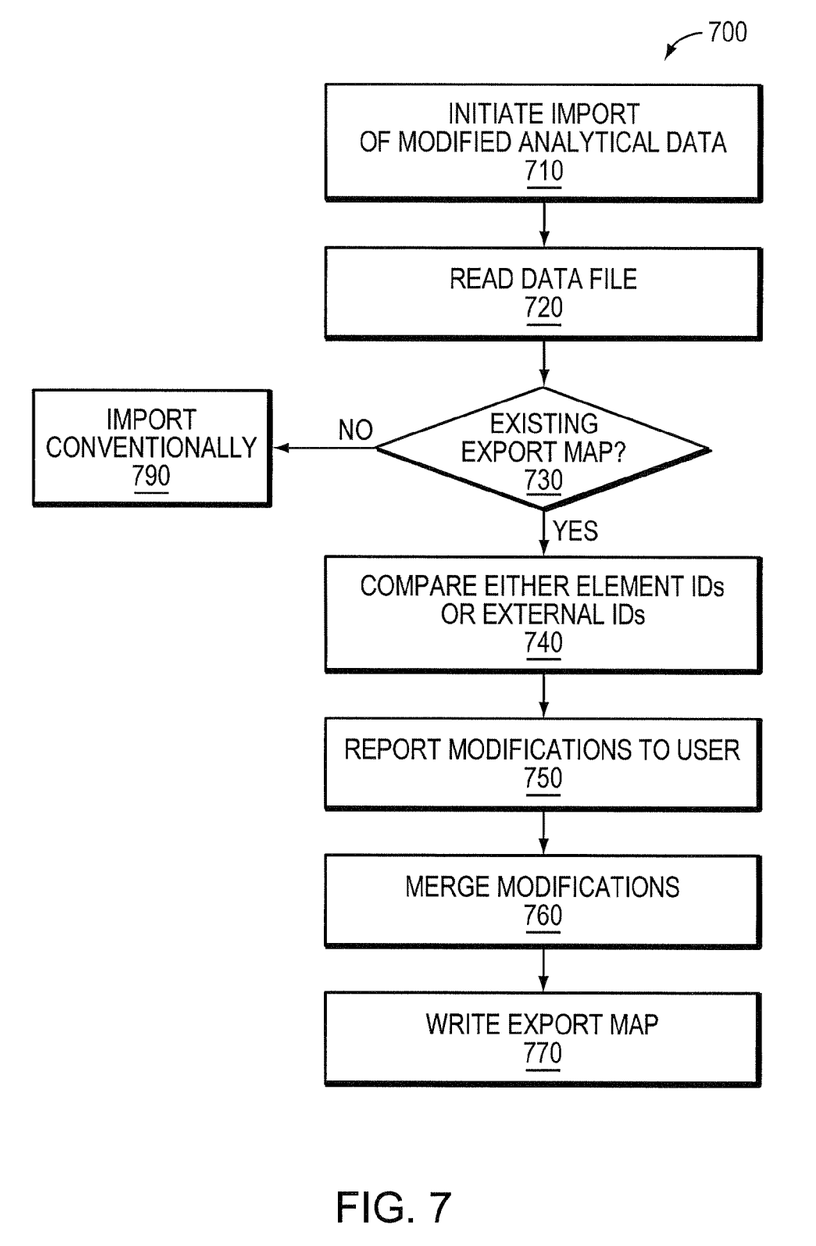
FIG. 7 is a flow diagram of an example import operation of analytical data from an analytical application to a structural modeling application.

FIG. 7 is a flow diagram of an example import operation of analytical data from an analytical application 155 to a structural modeling application 150. At step 710, a user selects an option to initiate an import of analytical data, for example using a graphical user interface. At step 720, the data file 158 maintained by the analytical application 155 is read by a translator. At step 730, a determination is made whether there is an existing export map 500 in the design file 200 maintained by the structural modeling application 150, which corresponds to the analytical data being imported. If not, progression may proceed to step 790 where the analytical model is updated using conventional techniques. If there is an export map 500, execution proceeds to step 740 and a comparison is made between IDs maintained in the data file 158 and the export map 500. More specifically, if element IDs are stored in the data file 158, these element IDs are compared with the list of element IDs 510 maintained in the export map 500. Otherwise, if element IDs are not stored in the data file 158, external IDs in the data file 158 are compared to the external IDs stored in the list of external IDs 520 maintained in the export map 500. Since the export map 500 represents a "snapshot" of the objects in the analytical model at the time of export, or just after a prior import, any more recent changes to the data file 200, for example due to continuing work in the structural modeling application 150, are not considered. As such, external modification are not confused with the internal modifications.

Figure 8:
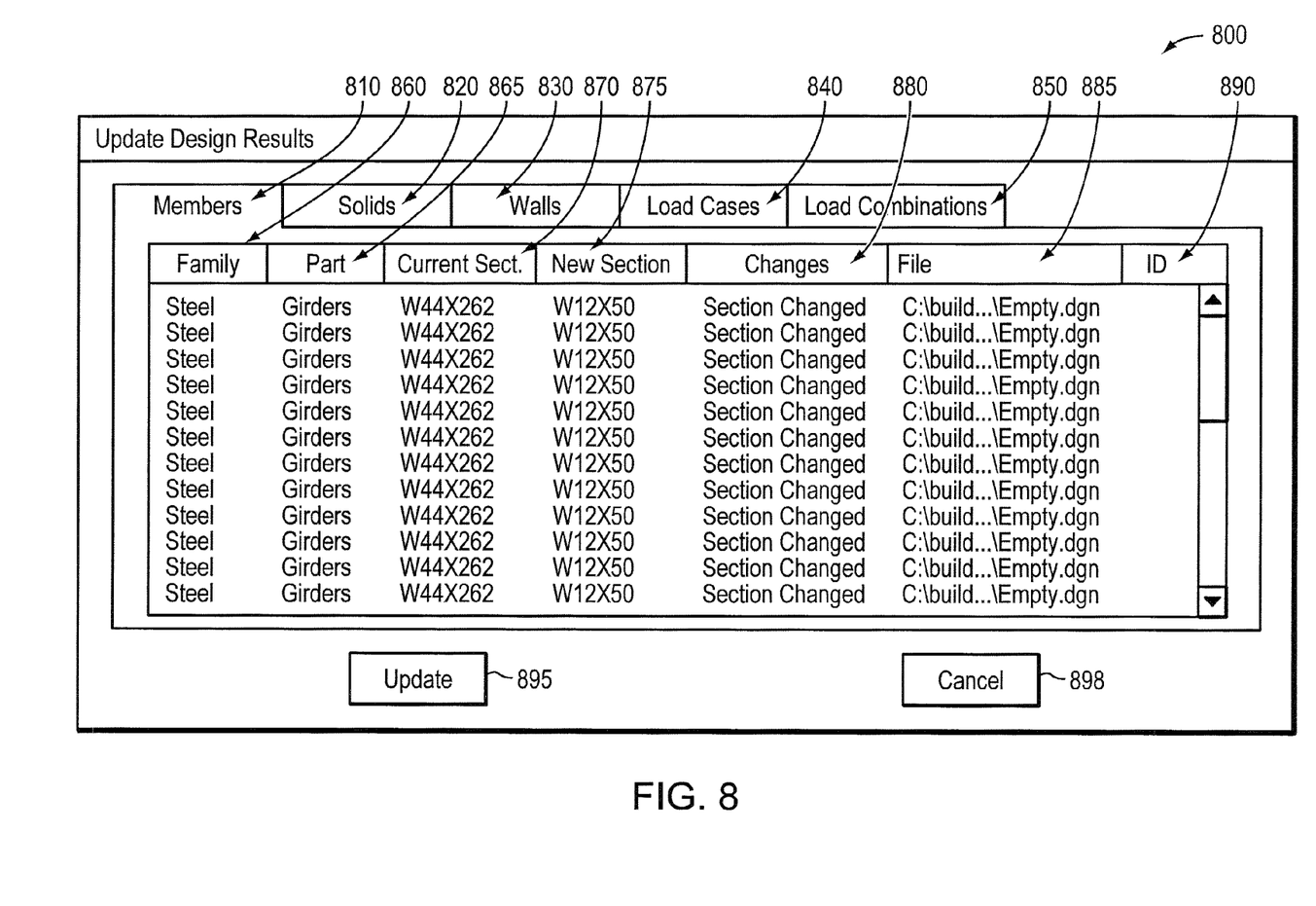
FIG. 8 is an example Update Design Results graphical user interface (GUI) for display of detected external modifications.

At step 750, the external modifications are reported to a user, for example via an "Update Design Results" GUI 800. In reference to FIG. 8, the Update Design Results GUI 800 may be organized into a plurality of object type tabs, for example, a tab for linear members 810, a tab for solids 820, a tab for walls 830, a tab for load cases 840, and a tab for load combinations 850. Any modifications to the corresponding types of objects are displayed in the appropriate tabs. Various information about the modifications may be shown. For example, for a linear member a family name 860, a part 865, a current section 870, a new section 875, a change 880, a file 885, and an ID 890 may be displayed to the user. In particular, the change 880 may indicate whether the modification is an addition, a change, or a deletion. The Update Design Results GUI 800 may allow a user to select that the external modifications are to be applied, for example by clicking an update button 895 or manipulating another user interface element. Alternately, the user may deny all external modifications, for example by clicking a cancel button 898 or manipulating some other user interface element.

Assuming the user selects to accept the external modifications, execution proceeds to step 760. At step 760, the external modifications are intelligently merged into the design file 200. Rather than indiscriminately overwriting duplicate objects in the design file 200, only existing objects that have been externally modified, as indicated by the export map 500 are updated. Such updating may involve changing the properties of an object, for example changing the endpoints of a linear member, adding an opening in a wall, modifying the equation of a load combination, or other modifications of existing object data. Updating may also involve adding new objects to the design file 200 or deleting particular objects from the design file 200. However, objects in the design file 200 that are not subject to external modification are left intact, to preserve any internal modifications.

At step 770, an export map 500 is written to reflect the changes to the analytical model in the design file 200. By capturing these changes in the export map 500, the techniques described herein may be applied to sequential imports of data from the analytical application 155.

While the above description discusses various embodiments of the present disclosure, it should be apparent that a number of modifications and/or additions may be made without departing from the disclosure's intended spirit and scope.

For example, while the specific embodiments discussed above involve round tripping of data between a structural modeling application 150 and an analytical application 155, the techniques disclosed herein may also be applicable to other types of applications. For example, the teachings may alternately be used with any of a variety of types of modeling applications and external applications, including architectural modeling applications, mechanical systems engineering applications, electrical systems engineering applications, site design applications, building operations and management applications, airport design applications, general-purpose CAD applications, graphics design applications, mathematical analysis applications, graphical programming applications, visualization applications, technical computing environments, or any of a variety of other types of applications.

Further, the above described techniques may be implemented in software, in hardware, or a combination thereof. A software implementation may include computer-executable instructions embodied in a computer-readable medium. A hardware implementation may include processors, memories, programmable logic circuits, application specific integrated circuits, and/or other types of hardware components. Further, a combined software/hardware implementation may include both computer-executable instructions embodied in a computer-readable medium, as well as one or more hardware components.

Accordingly, it should be understood that the above descriptions are meant to be taken only by way of example.

What is claimed is:

1. A method for exchanging data between a modeling application and an external application executing on one or more computer systems having a processor and a memory, comprising:
    initiating an export of model data from the modeling application executing on the one or more computer systems, the model data descriptive of a model maintained in the modeling application;
    generating an export map that captures an indication of each object in the model at a point in time of export of the model;
    passing the model data to the external application executing on the one or more computer systems;
    receiving modified model data from the external application;
    comparing the modified model data with the export map to detect external modifications made by the external application; and
    updating limited portions of the model in the modeling application to reflect the external modifications, while leaving intact portions of the model for which external modifications have not been detected.

2. The method of claim 1 further comprising:
    reporting the external modifications to a user; and
    presenting a user interface element to the user that when manipulated causes the model to be updated to reflect the external modifications.

3. The method of claim 1 wherein the external modifications include one or more external deletions, and the step of updating further comprises:
    deleting one or more portions of the model to reflect the one or more external deletions.

4. The method of claim 1 wherein the modeling application is a structural model application and the model is an analytical model of a structural system.

5. The method of claim 4 wherein the external application is a separate analytical application operable to analyze the structural system.

6. The method of claim 1 wherein each of a plurality of objects in the model maintained in the modeling application is associated with an element identifier (ID), and the step of generating comprises writing a list of element IDs into the export map for each object in the model at the point in time of export, and the step of comparing comprises comparing a plurality of element IDs in the modified model data with the list of element IDs in the export map.

7. The method of claim 1 wherein each of a plurality of objects in the model maintained in the modeling application is associated with an element identifier (ID), the step of initiating comprises translating each element ID to an external ID used by the external application, and the step of generating comprises writing a list of external IDs into the export map for each object in the model at the point in time of export, and the step of comparing comprises comparing a plurality of external IDs in the modified model data with the list of external IDs in the export map.

8. The method of claim 1 further comprising:
    subsequent to the step of passing, modifying the model internal to the modeling application; and
    wherein the step of updating preserves the modifications made internal to the modeling application while the model data is at the external application.

9. The method of claim 1 wherein the step of generating an export map comprises:
    writing the export map as a non-graphics object of a design file.

10. The method of claim 9 wherein the design file is a DGN file.

11. The method of claim 1 further comprising:
    writing an update map that captures an indication of each object in the model after the model is updated.

12. A non-transitory computer-readable medium containing executable program instructions for exchanging data between a modeling application and an external application, the executable program instructions operable to:
    initiate an export of model data from a modeling application, the model data descriptive of a model maintained in the modeling application;
    generate an export map that captures an indication of each object in the model at a point in time of export of the model;
    pass the model data to an external application;
    receive modified model data from the external application;
    compare the modified model data with the export map to detect external modifications made by the external application; and
    update limited portions of the model in the modeling application to reflect the external modifications, while leaving intact portions of the model for which external modifications have not been detected.

13. The non-transitory computer-readable medium of claim 12, further comprising executable program instructions operable to:
    report the external modifications to a user; and
    presenting a user interface element to the user that when manipulated causes the model to be updated to reflect the external modifications.

14. The non-transitory computer-readable medium of claim 12 wherein the external modifications include one or more external deletions, and the executable program instructions operable to update comprise executable program instructions operable to:
    delete one or more portions of the model to reflect the one or more external deletions.

15. The non-transitory computer-readable medium of claim 12 wherein the modeling application is a structural model application and the model is an analytical model of a structural system.

16. The non-transitory computer-readable medium of claim 12 wherein each of a plurality of objects in the model maintained in the modeling application is associated with an element identifier (ID), and the executable program instructions operable to generate comprise executable program instructions operable to write a list of element IDs in the export map for each object in the model at the point in time of export, and the executable program instructions operable to compare comprise executable program instructions operable to compare a plurality of element IDs in the modified model data with the list of element IDs in the export map.

17. The non-transitory computer-readable medium of claim 12 wherein each of a plurality of objects in the model maintained in the modeling application is associated with an element identifier (ID), and the executable program instructions operable to initiate comprise executable program instructions operable to translate each element ID to an external ID used by the external application, and the executable program instructions operable to generate comprise executable program instructions operable to write a list of external IDs in the export map for each object in the model at the point in time of export, and the executable program instructions operable to compare comprise executable program instructions operable to compare a plurality of external IDs in the modified model data with the list of external IDs in the export map.

18. The non-transitory computer-readable medium of claim 12, further comprising executable program instructions operable to:
modify the model internal to the modeling application;
wherein the executable program instructions operable to update preserve the modifications made internal to the modeling application while the model data is at the external application.

19. The non-transitory computer-readable medium of claim 12, wherein the executable program instructions operable to generate comprise executable program instructions operable to:
write the export map as a non-graphics object of a design file.

20. The non-transitory computer-readable medium of claim 12 further comprising executable program instructions operable to:
write an update map that captures an indication of each object in the model after the model is updated.

21. A computer system, comprising:
a processor; and
a memory configured to store software for execution on the processor, the software including
a modeling application configured to initiate an export of model data, the model data descriptive of a model maintained in the modeling application, and to generate an export map that captures an indication of each object in the model at a point in time of export of the model,
a translator configured to translate the model data, and
an external application configured to receive the model data, modify the model data and return modified model data to the modeling application,
wherein the modeling application is further configured to compare the modified model data with the export map to detect external modifications made by the external application and to update limited portions of the model in the is modeling application to reflect the external modifications, while leaving intact portions of the model for which external modifications have not been detected.

* * * * *

UNITED STATES PATENT AND TRADEMARK OFFICE
CERTIFICATE OF CORRECTION

PATENT NO.        : 8,001,552 B1
APPLICATION NO.   : 11/955069
DATED             : August 16, 2011
INVENTOR(S)       : Jason Chickneas

It is certified that error appears in the above-identified patent and that said Letters Patent is hereby corrected as shown below:

Col. 2, line 32 should read: "the analytical application and that have not is been changed"

Col. 4, line 27 should read: "an input/output (I/O) is bus 160, such as a Peripheral Com-"

Col. 5, line 2-3 should read: "vides modeling functionality. Similarly, the technology platis platform 152"

Signed and Sealed this
Twenty-third Day of October, 2012

David J. Kappos
*Director of the United States Patent and Trademark Office*